United States Patent
Adler

(10) Patent No.: US 7,706,780 B2
(45) Date of Patent: Apr. 27, 2010

(54) MOBILE COMMUNICATIONS TERMINAL AND METHOD THEREFORE

(75) Inventor: Mark Adler, Lexington, MA (US)

(73) Assignee: Nokia Corporation, Espoo (FI)

( * ) Notice: Subject to any disclaimer, the term of this patent is extended or adjusted under 35 U.S.C. 154(b) by 1365 days.

(21) Appl. No.: 11/023,214

(22) Filed: Dec. 27, 2004

(65) Prior Publication Data

US 2006/0142067 A1 Jun. 29, 2006

(51) Int. Cl.
*H04M 1/663* (2006.01)

(52) U.S. Cl. .................. 455/412.2; 455/563; 455/466; 455/412.1

(58) Field of Classification Search ............. 455/550.1, 455/575.3, 563, 466, 566, 567, 414.4, 414, 455/412.2, 412.1, 414.1, 413; 709/206; 379/88.19, 379/67.1; 704/260, 235

See application file for complete search history.

(56) References Cited

U.S. PATENT DOCUMENTS

| | | | | |
|---|---|---|---|---|
| 5,950,123 | A * | 9/1999 | Schwelb et al. | 455/414.4 |
| 6,006,088 | A * | 12/1999 | Couse | 455/415 |
| 6,690,923 | B1 * | 2/2004 | Ortiz Perez et al. | 455/74.1 |
| 2002/0131565 | A1 * | 9/2002 | Scheuring et al. | 379/88.19 |
| 2002/0160757 | A1 * | 10/2002 | Shavit et al. | 455/414 |
| 2004/0203351 | A1 * | 10/2004 | Shearer et al. | 455/41.1 |
| 2004/0225501 | A1 * | 11/2004 | Cutaia | 704/260 |
| 2004/0252679 | A1 * | 12/2004 | Williams et al. | 370/356 |
| 2004/0267527 | A1 * | 12/2004 | Creamer et al. | 704/235 |
| 2005/0010573 | A1 * | 1/2005 | Garg | 707/10 |
| 2005/0124388 | A1 * | 6/2005 | Seo et al. | 455/566 |
| 2005/0136955 | A1 * | 6/2005 | Mumick et al. | 455/466 |
| 2005/0181772 | A1 * | 8/2005 | Crowell | 455/414.1 |
| 2005/0251558 | A1 * | 11/2005 | Zaki | 709/206 |
| 2007/0082686 | A1 * | 4/2007 | Mumick et al. | 455/466 |
| 2007/0105590 | A1 * | 5/2007 | Tsukamoto | 455/556.2 |
| 2007/0184872 | A1 * | 8/2007 | Katayanagi | 455/550.1 |
| 2007/0255566 | A1 * | 11/2007 | Nguyen et al. | 704/257 |
| 2007/0263556 | A1 * | 11/2007 | Harris et al. | 370/312 |
| 2008/0004046 | A1 * | 1/2008 | Mumick et al. | 455/466 |

OTHER PUBLICATIONS

"Cingular Launches Software for Vision-Impaired Users", Mobile Tracker, Because You Can't Trust the Salesman, www.mobiletracker.net/archives/2004/09/16/cingular_launch.php, pp. 1-2, 2003-2004.
"Convenient Audio Access to Mobile Phones", ScanSoft, Productivity Without Boundaries, Speech Pak Talks, www.scansoft.com/speechtalk/talks/, pp. 1-2, 2004.
"Babel's Text-to-Speech Integrated into ALVA Mobile Phone Organizer", Speech Technology Magazine, www.speechtechmag.com/pub/industry/2587-1.html, pp. 1-2, Oct. 2003.

* cited by examiner

*Primary Examiner*—Tan Trinh
(74) *Attorney, Agent, or Firm*—Perman & Green LLP

(57) ABSTRACT

A method for notifying items in a mobile communication apparatus is disclosed, including the steps of: determining a text for notification of an item; generating a call to a telephone; and rendering the text by a synthetic voice through the call, and a computer program for performing the method. Further, a mobile communication apparatus including a user interface, a processor, and an application run by the processor is disclosed, wherein an item is generated in the application, and a notification text is associated with the item. The mobile communication apparatus further includes a text-to-speech generator for generating synthetic speech corresponding to the notification text; a means for generating a call to a telephone; and a means for rendering the synthetic speech through the call.

18 Claims, 1 Drawing Sheet

MOBILE COMMUNICATIONS TERMINAL AND METHOD THEREFORE

BACKGROUND OF THE INVENTION

1. Field of the Invention

The present invention relates to a method for notifying items from a mobile communication apparatus, a mobile communication apparatus, and a computer program.

2. Brief Description of Related Developments

A software for vision-impaired users of mobile communication apparatuses presenting caller IDs, phone settings, call logs, battery warnings, and calendar appointments, that otherwise are inaccessible to them, is disclosed on the news site www.mobiletracker.net. Creating, maintaining, and dialling from a personal contact list is also disclosed. The service is designed to handle the above mentioned tasks, as well as text messaging and e-mail by responding to spoken commands and then responding with a computer-generated voice. The software can also announce when e-mail or text messages arrive, or when calls are missed. However, this service requires an active handling of, and a new way of interacting with the mobile communication apparatus. It is therefore a problem with prior art that it do not fit into normal interaction with a telephone.

SUMMARY OF THE INVENTION

It is therefore an object of the present invention to provide improved interaction with a mobile communication apparatus.

The above object is provided according to a first aspect of the present invention by a method for notifying items from a mobile communication apparatus, comprising the steps of: determining a text for notification of an item; generating a call to a telephone; and rendering said text by a synthetic voice through said call.

An advantage of this is that the user experiences a phone call, which is a normal and for the user well known manner of interacting with the telephone, when a synthetically generated voice is to notify the user.

The method may further comprise the step of determining a notification time for said item.

An advantage of this is that a time for notification is chosen to improve the interaction, such that the user experiences less stress, gets the notifications in time, or is able to control the time of interaction.

The item may be a calendar item, where the notification time is determined from the calendar item, and the notification text is a reminder associated with the calendar item.

The item may be an SMS or an e-mail.

The mobile communication apparatus may also be the telephone, and the call may be a simulated call generated in said mobile communication apparatus. I.e., no call involving base stations and network is used; only a call in the sense of that the user experiences an incoming phone call is generated.

An advantage of this is that no other devices but the mobile communication apparatus, with optional headset, handsfree equipment, etc, are involved in the notification.

The item may be an SMS, an e-mail, a list of missed calls, or a calendar item.

An advantage of this is that text based information is provided to a user through a simulated phone call, thus providing an improved user interface for e.g. vision-impaired users, users driving a car, craftsmen in work, etc.

The method may further comprise the step of determining the telephone from the item.

The above object is provided according to a second aspect of the present invention by a mobile communication apparatus comprising a user interface, a processor, and an application run by said processor, wherein an item is generated in said application, and a notification text is associated with said item. The mobile communication apparatus further comprises a text-to-speech generator for generating synthetic speech corresponding to the notification text; a means for generating a call to a telephone; and a means for rendering the synthetic speech through the call.

The mobile communication apparatus may also be the telephone, wherein the call is a simulated call through the user interface. I.e., no call involving base stations and network is used; only a call in the sense of that the user experiences an incoming phone call is generated. An advantage of this is that text based information is converted to synthetic speech and provided to a user through a simulated phone call through the user interface, thus providing improved usability for the mobile communication apparatus for e.g. vision-impaired users, users driving a car, craftsmen in work, etc.

The application may be a calendar application, where the item is a calendar item, and the notification text is a reminder associated with the calendar item.

A time of notification may be associated with the item, wherein the text-to-speech generator, means for generating a call, and means for rendering the synthetic speech are arranged to be activated at the time of notification. Thus, notification is presented at a proper instant of time.

The mobile communication apparatus may further comprise a parser arranged to determine the notification text from the item. Thus, the notification text may be derived from the text comprised in the item, and further information added, e.g. about from which service the information emanates.

The mobile communication apparatus may further comprise a parser arranged to determine the telephone from the item. For example, this may be telephone numbers to other participants to a meeting in a calendar item.

Other advantages of the second aspect of the invention are similar to those of the first aspect of the invention.

The above object is provided according to a third aspect of the present invention by a computer program arranged to perform the method according to the first aspect of the present invention when downloaded into and run on a mobile communication apparatus.

An advantage of this is that the features of the present invention are enabled in any mobile communication apparatus having the ability to download and run such a computer program.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF THE PREFERRED EMBODIMENT

Figure 1:
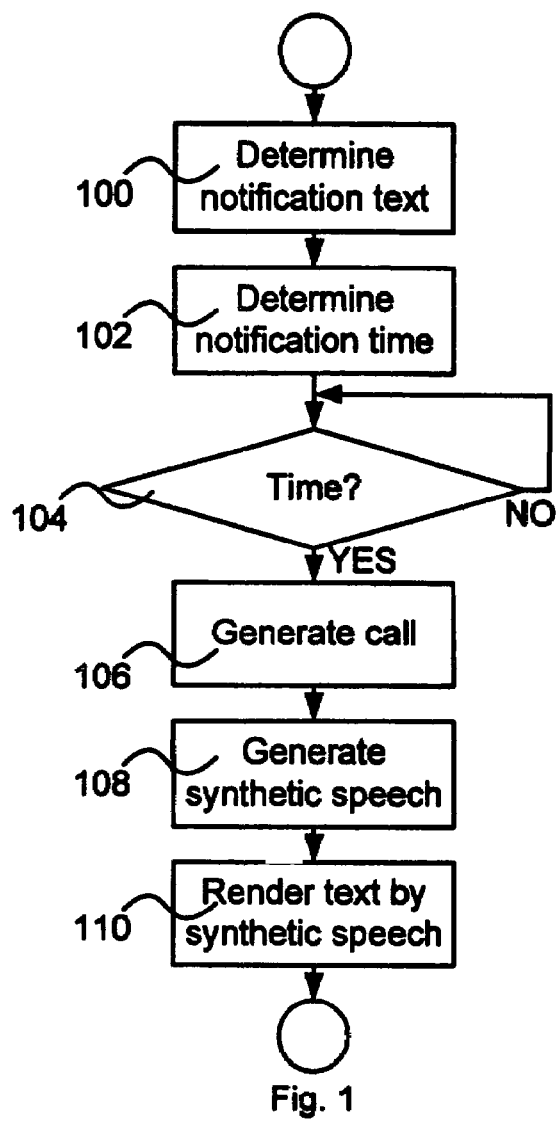
FIG. 1 is a flow chart of an embodiment of the present invention.

FIG. 1 is a flow chart of an embodiment of the present invention. In a notification text determination step 100, a text associated with an item of an application in a mobile communication apparatus is determined. The item can be a caller ID, phone setting, call log, battery warning, personal contact list, text message, e-mail or calendar appointment, or any other item, which comprises text or is related to a user interface generated text, associated with an application. In a notification time determination step 102, a time for notification is determined. The time can be a specific time of day, a date, a date and time, or just defined as "asap" ("as soon as possible"). The time can be predetermined by an application or a user, or dynamically generated by an application. In a time check step 104, it is checked if it is the right time for notification. If not, the method loops the time check step 104. If it is the right time, the method continues to a call generation step 106. The call is either a normal call, a simulated call, or both. When it is a simulated call, the call is not generated in the sense of a call between communicating entities over a network. The simulated call is a call in the sense of what the user experiences, i.e. the mobile communication apparatus alerts the user in a normal fashion by ring signal and/or vibrations, and the user can pick up the phone and answer to get the message, as will be described below. This is to establish a communication between the mobile communication apparatus and the user, and does not neccesarily involve any network or other communication parties.

A synthetic speech corresponding to the notification text determined in the notification text determination step 100 is generated in a synthetic speech generation step 108. When the user has answered, a synthetic voice delivers the speech message in a text rendering by synthetic speech step 110, and thus the user is notified and can hang up.

Alternatively, a call is generated to another communication apparatus, as a normal phone call, often called POTS (Plain Old Telephone Service). The communication apparatus can be any communication apparatus capable of receiving a telephone call, e.g. a mobile communication apparatus or a fixed telephone, i.e. a telephone. The receiving telephone experiences a normal incoming call. Thus, the receiving telephone do not need any additional features. The receiving user picks up the phone and receives the rendered text as a synthetic voice through the call. An example where this is feasible is when a calendar item in the mobile communication apparatus also involves reminding a friend of the occasion. Another example is when a message, e.g. an SMS, is to be sent, or forwarded, to a friend that is vision-impaired. The message can then be set as an item to be communicated as described above. It is possible to communicate the message as described above to one or more telephones, among which the mobile communication apparatus initiating the communication can be one.

A special feature of this invention is that only the mobile communication apparatus initiating the communication needs any modifications compared to a normal phone.

Figure 2:
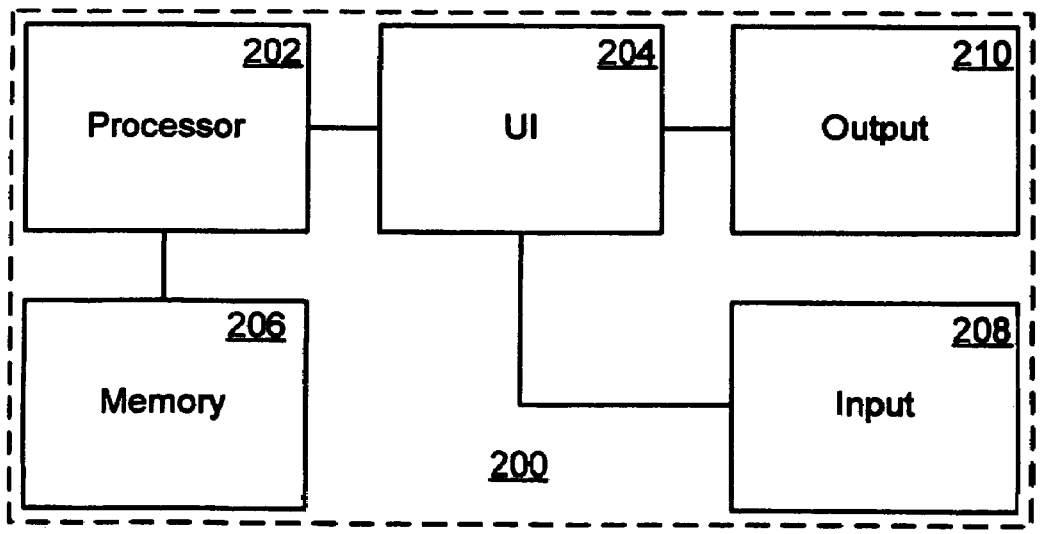
FIG. 2 schematically illustrates a mobile communication apparatus.

FIG. 2 schematically shows a mobile communication apparatus 200 according to an embodiment of the present invention. It should be noted that parts not contributing to the core of the invention are left out not to obscure the features of the present invention. The mobile communication apparatus comprises a processor 202, a user interface (UI) 204, and a memory 206. The memory 206 holds, among other things, program code for operation of applications of the mobile communication apparatus. The memory 206 also holds data used by the applications. Here, the memory 206 is depicted as a single unit. However, the memory can be two or more units, and/or divided in partitions. Examples of applications relevant for the understanding of the present invention are text-to-speech generator, parser, and the application from which the item to be notidied emanates, e.g. a calendar application or a message service application. Preferably, program code for applications can be downloaded to the memory 206, and the downloaded program code can then be executed by the processor 202.

The user interface 204 comprises an input 208 and an output 210. The input 208 can comprise a keypad, keyboard, wheelpad, and/or speech controlled input. The output 210 can comprise a speaker, headset, display, buzzer, and/or vibrator.

The function of the invention in the mobile communication apparatus will be described below by an illustrative example, from which also other operation scenarios will be easily understood by the artisan.

A calendar application is run on the processor 202. The calendar comprises one or more items, e.g. appointments. An appointment comprises a time, a date, some information text, and a time and date for a reminder. Program code in the memory 206 for notification of items is run simultaneously on the processor 202, which causes the processor 202 to determine a notification text, which is the information text, preferably together with some common information that it is a calendar item of an appointment, and a time for notification, which is the reminder time in the calendar item. When the time for notification occurs, the processor 202 causes the user interface 204 to generate a call situation, where the buzzer and/or vibrator alerts the user. When the user answers, the user interface 204 gets an indication of this through the input 208 and communicates information of this to the processor 202. The processor 202 then runs a text-to-speech application, which generates a synthetic voice message, which is presented to the user through the speaker or through a headset of the output 210. The user is thus notified by a synthetic voice message based on the determined text, and can then hang up. The same applies when a remote telephone is called to get the notification by the synthetic coice over POTS.

In the example above, the text and time can be determined by a parser parsing the information text to find information that is relevant to the notification. As described above, communication to other telephones can also be initiated. The parser can parse the item for determining the other telephones, i.e. the telephone numbers to them. The item can also be a received or stored text message, an e-mail, a list of missed calls, etc.

Another example is when a text message is to be forwarded to a vision-impaired person. The information text of the text message is determined, and information about the sender and/or forwarder and, preferably, some information that it is a text message converted to speech is added to the information text to form a notification text. A call is generated to the vision-impaired person's telephone, and when the person answers, the notification text is rendered by the synthetic voice over POTS to the person.

Features comprising detecting the answering phrase of the receiving party is preferable, such that the rendering of the text begins after the answering phrase.

The invention claimed is:

1. A method comprising:
   notifying items from a mobile communication apparatus by
      determining a text for notification of an item;
      generating a call to a telephone; and
      utilizing the mobile communication apparatus to render said text by a synthetic voice through said call.

2. The method according to claim 1, further comprising determining a notification time for said item.

3. The method according to claim 2, wherein said item is a calendar item, said notification time is determined from said calendar item, and said notification text is a reminder associated with said calendar item.

4. The method according to claim 1, wherein said item is an SMS.

5. The method according to claim 1, wherein said item is an e-mail.

6. The method according to claim 1, wherein said mobile communication apparatus also is said telephone, and said call is a simulated call generated in said mobile communication apparatus.

7. The method according to claim 6, wherein said item is an SMS, an e-mail, a list of missed calls, or a calendar item.

8. The method according to claim 1, wherein said communication apparatus is predefined.

9. The method according to claim 1, further comprising determining said communication apparatus from said item.

10. A computer program arranged to perform the method according to claim 1 when downloaded into and run on a mobile communication apparatus.

11. An apparatus comprising:
a user interface,
a processor for mobile communication,
an application run by said processor, wherein an item is generated in said application, and a notification text is associated with said item,
a text-to-speech generator for generating synthetic speech corresponding to said notification text;
a call generator for generating a call to a telephone; and
an output for rendering said synthetic speech through said call.

12. The apparatus according to claim 11, comprising said telephone, and said call is a simulated call generated in said apparatus through said user interface.

13. The apparatus according to claim 11, wherein said application is a calendar application, said item is a calendar item, and said notification text is a reminder associated with said calendar item.

14. The apparatus according to claim 11, wherein a time of notification is associated with said item, wherein said text-to-speech generator, means for generating a call, and means for rendering said synthetic speech are arranged to be activated at said time of notification.

15. The apparatus according to claim 11, further comprising a parser arranged to determine said notification text from said item.

16. The apparatus according to claim 11, further comprising a parser arranged to determine said communication apparatus from said item.

17. The apparatus according to claim 11, wherein said item is an SMS.

18. The apparatus according to claim 11, wherein said item is an e-mail.

* * * * *